No. 614,910. Patented Nov. 29, 1898.
H. G. WARREN.
HAND DRILL.
(Application filed Feb. 10, 1898.)
(No Model.)
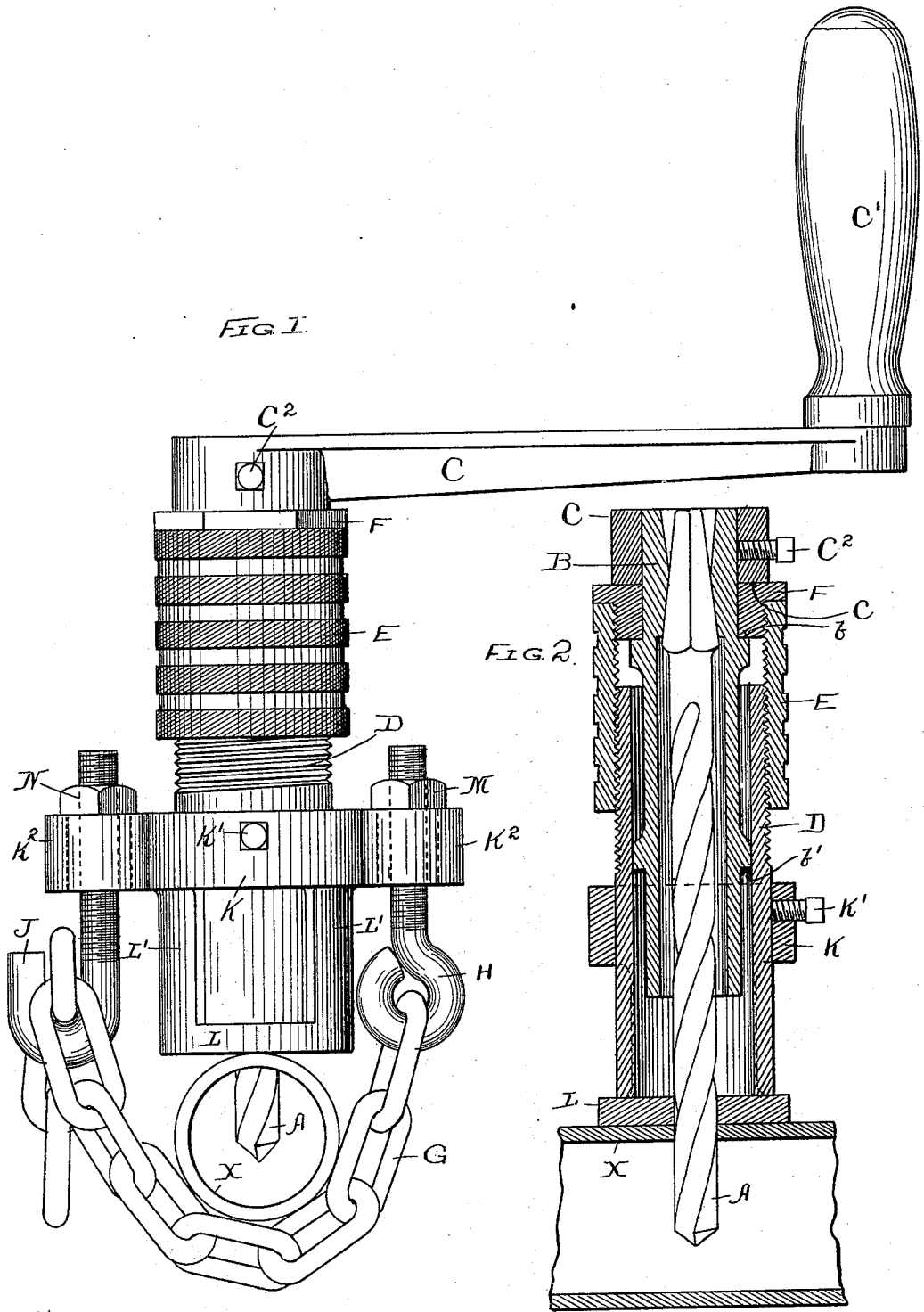
WITNESSES:
Sew. C. Curtis
H. W. Munday
INVENTOR:
HORACE G. WARREN
BY Munday, Warts & Adcock,
HIS ATTORNEYS.
THE NORRIS PETERS CO., PHOTO-LITHO., WASHINGTON, D. C.

UNITED STATES PATENT OFFICE.

HORACE G. WARREN, OF EARLVILLE, ILLINOIS, ASSIGNOR TO HIMSELF AND JOSEPH E. PORTER, OF OTTAWA, ILLINOIS.

HAND-DRILL.

SPECIFICATION forming part of Letters Patent No. 614,910, dated November 29, 1898.

Application filed February 10, 1898. Serial No. 669,794. (No model.)

*To all whom it may concern:*

Be it known that I, HORACE G. WARREN, a citizen of the United States, residing in Earlville, in the county of La Salle and State of Illinois, have invented a new and useful Improvement in Hand-Drills, of which the following is a specification.

My object in this invention is to produce a construction of hand-drill in which the chain or flexible device by which the drill is clamped to the work may be adjusted to any length required to render it tight, so that the work may be firmly held by it.

Another object has been to adapt the drill-holder so it may be used with either long or short drills.

The construction by which I attain these and other desirable results is fully shown in the accompanying drawings, and is also fully set forth in the description which I give below, and to which for the better understanding of the invention reference is hereby made.

In said drawings, Figure 1 is a side elevation of my improved drill, showing it in use; and Fig. 2 is a vertical section thereof.

In said drawings, A represents the drill proper or drilling-tool, the upper or squared end of which is inserted in the tool-holder B, which at one end is provided with a socket to correspond to the squared end of the drill. The holder is encircled at its upper end by the eye of a crank C, having a handle C', whereby it may be operated, and also having a set-screw C² for securing the eye to the holder. The holder both rotates and moves longitudinally in the guide tube or cylinder D, the former movement being received from the crank, as will be understood, and the latter being imparted by an adjusting-nut E, threaded upon the exterior of the guide-tube and provided at its upper end with a collar F, which is confined upon the holder B between the shoulder *b* and the crank-eye. The collar F turns, of course, with the nut E, and the latter is preferably milled upon its exterior, as shown, so it may be easily operated by hand.

The drill is shown in the drawings as having cut a hole in a piece of pipe X. This work is attached to the drill by a chain G, passed around it, as shown, one end of said chain being held by the eye H and the other end by the hook J. The hook J is adapted to engage the links of the chain in such manner as to prevent the chain being drawn through the hook. In other words, the opening of the hook is restricted, so that any link can lie in it edgewise, but the next link cannot be drawn through, because it is presented to the hook with its width at right angles to the hook-opening. It rarely happens that the work can be made tight by the use of a chain which permits no adjustments smaller than the length of its individual links, and hence I attach either said eye or said hook, or both of them, to the drill by an adjustable threaded connection, as hereinafter set forth.

Around the base of the guide tube or cylinder is a collar K, secured to the tube by the set-screws K' and provided with oppositely-extending ears K². This collar is preferably in one piece with the base-plate L, being connected thereto by the side cheeks L'. The ears K² are each pierced with vertical openings, and through these openings pass the threaded stems of the eye H and hook J, nuts M and N being applied to the stems above the ears. It will now be seen that to obtain any small adjustment of the chain it is only necessary to operate one or the other of the nuts M N, so that in case the chain cannot be made to clamp the work tightly by the link adjustment at the hook J any further adjustment needed may be readily obtained by moving the nuts M or N as needed.

The socket of the tool-holder is located near one end of the holder and is tapered in both directions—that is, toward each end, as shown—so that the holder may be reversed from the position shown at Fig. 2 in case it is desired to use it with a short drill, such reversal bringing the socketed end in which the tool is inserted to the lower position and near the work. This feature also permits the use of long drills for boring deep holes or for boring holes at a considerable distance from the base of the drill. When thus reversed and used with a short drill, the holder supports the tool very near the work.

The chain holding and adjusting devices H and J can be retracted entirely above the plane of the base of the drill if the work requires that to be done.

The crank can be attached with equal facility to the lower end of the tool-holder in case it is desired to use the latter in its reversed position. The ring F can also be similarly positioned at the other end of the holder, the latter being provided with a shoulder $b'$, which is a duplicate of and serves the same purpose as the shoulder $b$ when the holder is reversed.

I claim—

1. The hand-drill having a reversible tool-holder provided with two sockets receiving the tool from opposite directions, one socket being located farther in the holder than the other, substantially as specified.

2. The hand-drill, consisting of a tool-holder, a crank for rotating said holder, a guide-tube in which said holder rotates and moves longitudinally, and means for adjusting said holder, said crank serving also to attach the holder to the adjusting means, substantially as specified.

3. The hand-drill provided with a reversible holder having both its ends adapted to receive a crank, and a crank C adapted to be detachably secured directly upon either end of the holder, substantially as specified.

4. The hand-drill provided with a reversible tool-holder having a double socket for the drill near one of its ends, substantially as specified.

5. The hand-drill wherein are combined a reversible tool-holder having a double socket for the drill, an operating-crank adapted to be secured to the end of the holder, and means for clamping the drill to the work, substantially as specified.

HORACE G. WARREN.

Witnesses:
L. EWING PORTER,
LEE H. HOOK.